United States Patent
Horita et al.

(10) Patent No.: US 11,940,784 B2
(45) Date of Patent: Mar. 26, 2024

(54) MONITORING CONTROL APPARATUS

(71) Applicant: Mitsubishi Electric Corporation, Tokyo (JP)

(72) Inventors: Masaki Horita, Tokyo (JP); Teppei Ogiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 112 days.

(21) Appl. No.: 17/615,119

(22) PCT Filed: Jul. 9, 2019

(86) PCT No.: PCT/JP2019/027139
§ 371 (c)(1),
(2) Date: Nov. 30, 2021

(87) PCT Pub. No.: WO2021/005713
PCT Pub. Date: Jan. 14, 2021

(65) Prior Publication Data
US 2022/0236727 A1    Jul. 28, 2022

(51) Int. Cl.
*G05B 23/02*    (2006.01)
(52) U.S. Cl.
CPC ................ *G05B 23/0259* (2013.01)
(58) Field of Classification Search
CPC ............ G05B 23/024; G05B 23/042; G05B 19/0428; G05B 19/048;
(Continued)

(56) References Cited

U.S. PATENT DOCUMENTS

| | | | |
|---|---|---|---|
| 2013/0103353 A1* | 4/2013 | Kloppner | G06F 11/3058 702/182 |
| 2014/0203941 A1 | 7/2014 | Kaneko | |

(Continued)

FOREIGN PATENT DOCUMENTS

| | | | | |
|---|---|---|---|---|
| CN | 106411617 A | * | 2/2017 | ......... H04L 41/0631 |
| WO | 2013047651 A1 | | 4/2013 | |
| WO | WO-2019116515 A1 | * | 6/2019 | ............... B66B 5/00 |

OTHER PUBLICATIONS

International Search Report (PCT/ISA/210) with translation and Written Opinion (PCT/ISA/237) dated Sep. 24, 2019, by the Japan Patent Office as the International Searching Authority for International Application No. PCT/JP2019/027139. (8 pages).

*Primary Examiner* — Santosh R Poudel
(74) *Attorney, Agent, or Firm* — BUCHANAN INGERSOLL & ROONEY PC

(57) ABSTRACT

A monitoring control apparatus includes: a display controller to display an alarm screen for notifying a plurality of abnormalities occurring in a monitoring target device provided in an electric power system; a selector to select a first abnormality among the plurality of abnormalities; a degree-of-association calculator to calculate, for each of one or more other abnormalities except for the first abnormality among the plurality of abnormalities, a degree of association of the other abnormality with the first abnormality; and an extractor to extract the other abnormality as an associated abnormality associated with the first abnormality when the degree of association of the other abnormality is not less than a threshold. The alarm screen includes an associated alarm for notification of the extracted associated abnormality.

9 Claims, 9 Drawing Sheets

(58) Field of Classification Search
CPC ........... G05B 2219/24015; G05B 2219/31438; G05B 23/0227; G05B 23/0259; G06F 9/542; G06F 9/4881; G06F 9/5038
See application file for complete search history.

(56) References Cited

U.S. PATENT DOCUMENTS

| | | | |
|---|---|---|---|
| 2015/0066435 A1* | 3/2015 | Basu | G01R 31/40 702/189 |
| 2019/0033351 A1* | 1/2019 | Takata | G06F 9/5038 |
| 2020/0293012 A1* | 9/2020 | Hattori | G05B 23/0283 |

* cited by examiner

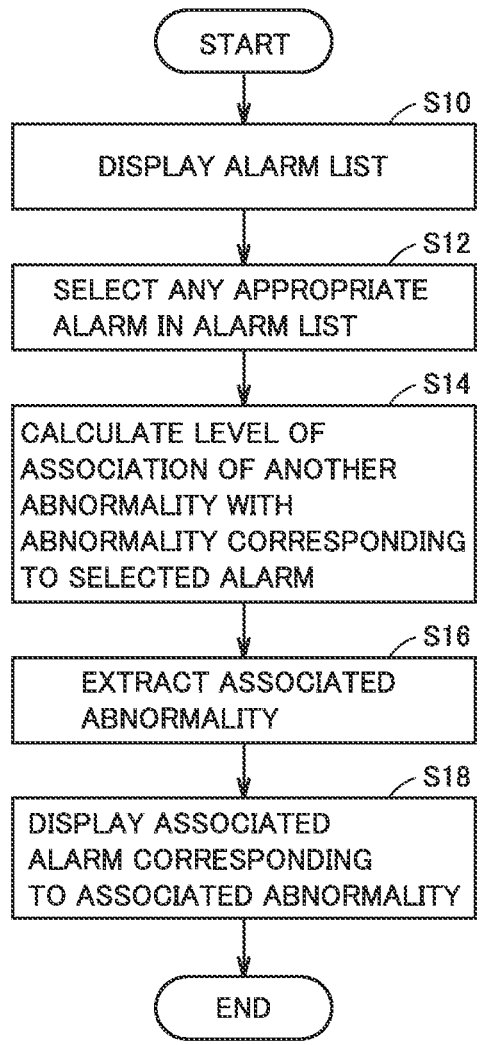

FIG.9

ALARM LIST — 310

| Index | TIME OF OCCURRENCE | ALARM NAME | STATUS |
|---|---|---|---|
| 1 | 6/24 10:50 | INCOMPLETE TAP CHANGING | OCCURRED |
| 2 | 6/24 10:42 | TRANSFORMER PRESSURE RELIEF VALVE OPERATED | OCCURRED |
| 3 | 6/24 10:41 | LR ABNORMALITY | OCCURRED |
| 4 | 6/24 10:40 | TRANSFORMER GAS DETECTED | OCCURRED |
| 5 | 6/24 10:36 | TRANSFORMER OVERCURRENT | OCCURRED |

321 — ALARM NAME: TRANSFORMER PRESSURE RELIEF VALVE OPERATED

DIAGRAM DISPLAYED: [SCHEMATIC DIAGRAM] — 322

323 {
REMEDY 1: STOP OF TRANSFORMER OPERATION
REMEDY 2: ANALYSIS OF GAS
REMEDY 3: INTERNAL INSPECTION
}

ASSOCIATED ALARM — 330

332 {
TRANSFORMER GAS DETECTED
TRANSFORMER OVERCURRENT
}

FILTER: LEVEL 2 — 331

MONITORING CONTROL APPARATUS

TECHNICAL FIELD

The present disclosure relates to a monitoring control apparatus.

BACKGROUND ART

A conventional monitoring control system in an electric power system widely adopts the function of, in the event of any abnormality in a monitoring target device, displaying an alarm message on a human machine interface (HMI) screen to notify a system operator with the occurring abnormality.

As a technique of issuing an alarm, for example, WO 2013/047651 (PTL 1) discloses a technique of determining a parent-child relationship between alarms and grouping alarms having the parent-child relationship, and causing a touch panel display to display the alarms having the parent-child relationship.

CITATION LIST

Patent Literature

PTL 1: WO 2013/047651

SUMMARY OF INVENTION

Technical Problem

In PTL 1, the alarm issued based on the alarm from the interlock management unit is defined as "parent alarm", and the alarm issued based on the alarm from the module controller is defined as "child alarm", and the alarms are associated with each other. It is disclosed that, as the method for association, a list of alarm names is stored in advance in the interlock management unit and the module controllers depending on the type of interlock factor.

In PTL 1, however, the parent alarm and the child alarm are merely associated with each other in advance. Thus, in the event where multiple abnormalities have occurred in a monitoring target device, a degree of association of an abnormality with any other abnormality cannot be appropriately notified to a system operator at the moment of the occurrence.

An object in an aspect of the present disclosure is to provide a monitoring control apparatus that can more appropriately notify the association among a plurality of abnormalities of a monitoring target device provided in an electric power system.

Solution to Problem

A monitoring control apparatus according to an embodiment includes: a display controller to display an alarm screen for notifying a plurality of abnormalities occurring in a monitoring target device provided in an electric power system; a selector to select a first abnormality among the plurality of abnormalities; a degree-of-association calculator to calculate, for each of one or more other abnormalities except for the first abnormality among the plurality of abnormalities, a degree of association of the other abnormality with the first abnormality; and an extractor to extract the other abnormality as an associated abnormality associated with the first abnormality when the degree of association of the other abnormality is not less than a threshold. The alarm screen includes an associated alarm for notification of the extracted associated abnormality.

Advantageous Effects of Invention

According to the present disclosure, the association among a plurality of abnormalities of a monitoring target device provided in an electric power system can be notified more appropriately.

BRIEF DESCRIPTION OF DRAWINGS

FIG. 8 shows an example procedure of the monitoring control apparatus.

FIG. 9 shows an example alarm screen according to another embodiment.

DESCRIPTION OF EMBODIMENTS

Figure 1:
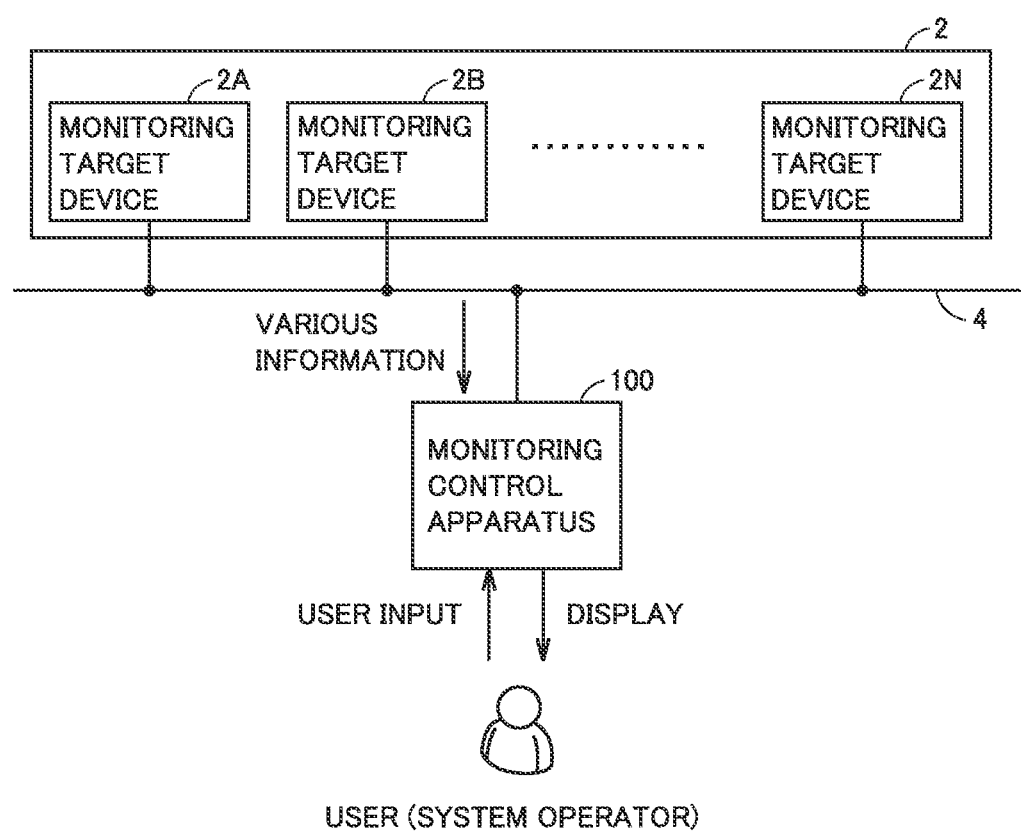
FIG. 1 shows an example system configuration including a monitoring control apparatus.

Embodiments will now be described with reference to the drawings. The same or corresponding parts in the drawings have the same reference characters allotted. Their names and functions are also the same. Thus, detailed description thereof will not be repeated.

<System Configuration>

FIG. 1 shows an example system configuration including a monitoring control apparatus 100. Referring to FIG. 1, monitoring control apparatus 100 is used for monitoring and control of a relatively large-scale apparatus or facility, such as control of an electric power system. Monitoring control apparatus 100 typically receives signals indicating various statuses of a monitoring target device (also simply referred to as "target device" below) and detects an abnormality of the monitoring target device based on the received signal.

Specifically, monitoring control apparatus 100 monitors and controls various target devices 2A, 2B, . . . 2N (also collectively referred to as "target device 2" below) provided in an electric power system. Examples of target device 2 include transformer station equipment such as a gas circuit breaker (GCB), a transformer, a current transformer, a potential transformer, a disconnecting switch, an earthing switch, and a lightning arrester provided in an electric power system including an electric power station, a transformer station and the like. Target device 2 has a communications function for communications with monitoring control apparatus 100.

Monitoring control apparatus 100 is configured so as to communicate with target device 2 via a network 4. Monitoring control apparatus 100 collects various pieces of information from target device 2 and stores the various pieces of information in an internal memory or the like. Network 4 is, for example, a wide-area internet protocol (IP) network laid over a wide area.

Monitoring control apparatus 100 generates various screens for monitoring and control of target device 2 and displays the generated various screens on a display. Specifically, monitoring control apparatus 100 displays an alarm screen for notifying the nature of an abnormality of target device 2 which is detected based on signals from various detection circuits (e.g., sensors) provided in target device 2. This allows a user (e.g., system operator) operating monitoring control apparatus 100 can check the presence or absence of an abnormality of target device 2. The system operator performs operation input to monitoring control apparatus 100 using a keyboard, a mouse or the like while checking the alarm screen. The manner of displaying the alarm screen in monitoring control apparatus 100 will be described below in detail.

<Hardware Configuration>

Figure 2:
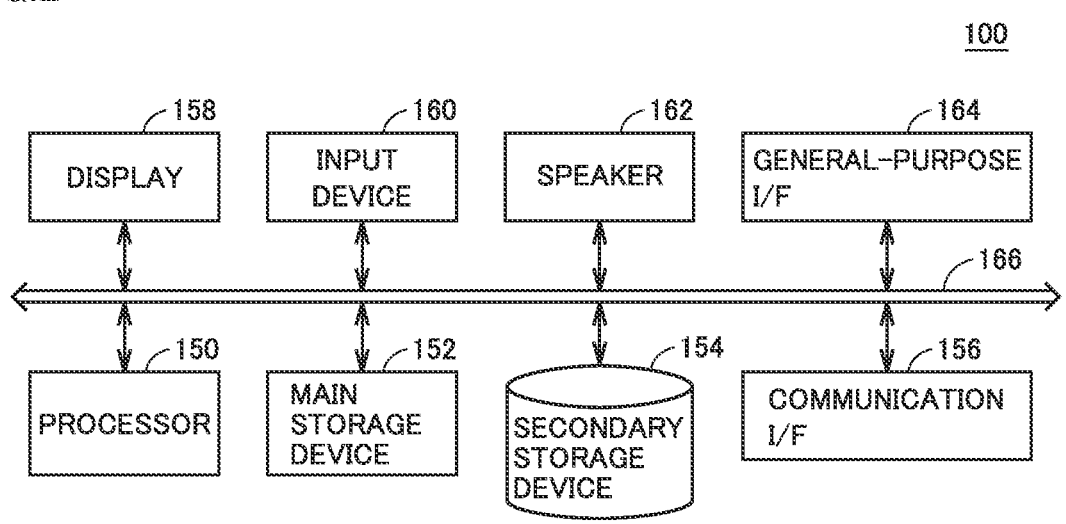
FIG. 2 is a block diagram showing an example hardware configuration of the monitoring control apparatus.

FIG. 2 is a block diagram showing an example hardware configuration of monitoring control apparatus 100. Referring to FIG. 2, monitoring control apparatus 100 includes a processor 150, a main storage device 152, a secondary storage device 154, a communication interface (I/F) 156, a display 158, an input device 160, a speaker 162, and a general-purpose interface (I/F) 164 as components thereof. These components are communicatively connected with each other via an internal bus 166.

Processor 150 is typically an arithmetic processing unit such as a central processing unit (CPU) or a multi processing unit (MPU). Processor 150 reads various programs including an OS installed in secondary storage device 154 and executes the various programs while deploying the various programs to main storage device 152.

Main storage device 152 is typically a volatile storage medium such as a dynamic random access memory (DRAM) and holds codes of various programs including the OS executed by processor 150, as well as various pieces of work data necessary for execution of the various programs. Secondary storage device 154 is a non-volatile storage medium such as a hard disk or a solid state drive (SSD) and holds various programs including an OS, as well as various setting values.

Communication interface 156 performs processing related to communications with the apparatus. Communication interface 156 is typically an interface for monitoring control apparatus 100 to communicate with target device 2 via network 4.

Display 158 displays various pieces of information in accordance with an instruction of processor 150. Input device 160 typically includes a keyboard, a mouse and the like, and accepts various settings and operations from the user. Input device 160 may include a touch panel. Speaker 162 converts an audio signal provided from processor 150 into a voice and then outputs the voice to the outside of monitoring control apparatus 100.

General-purpose interface 164 typically includes a universal serial bus (USB) interface, an RS-232C-compliant serial communication interface, a parallel communication interface and the like, and exchanges data with an external device or the like.

Monitoring control apparatus 100 may further include a light emitting diode (LED) lamp or the like for notifying target device 2 of an occurring abnormality.

<Alarm Screen>

Figure 3:
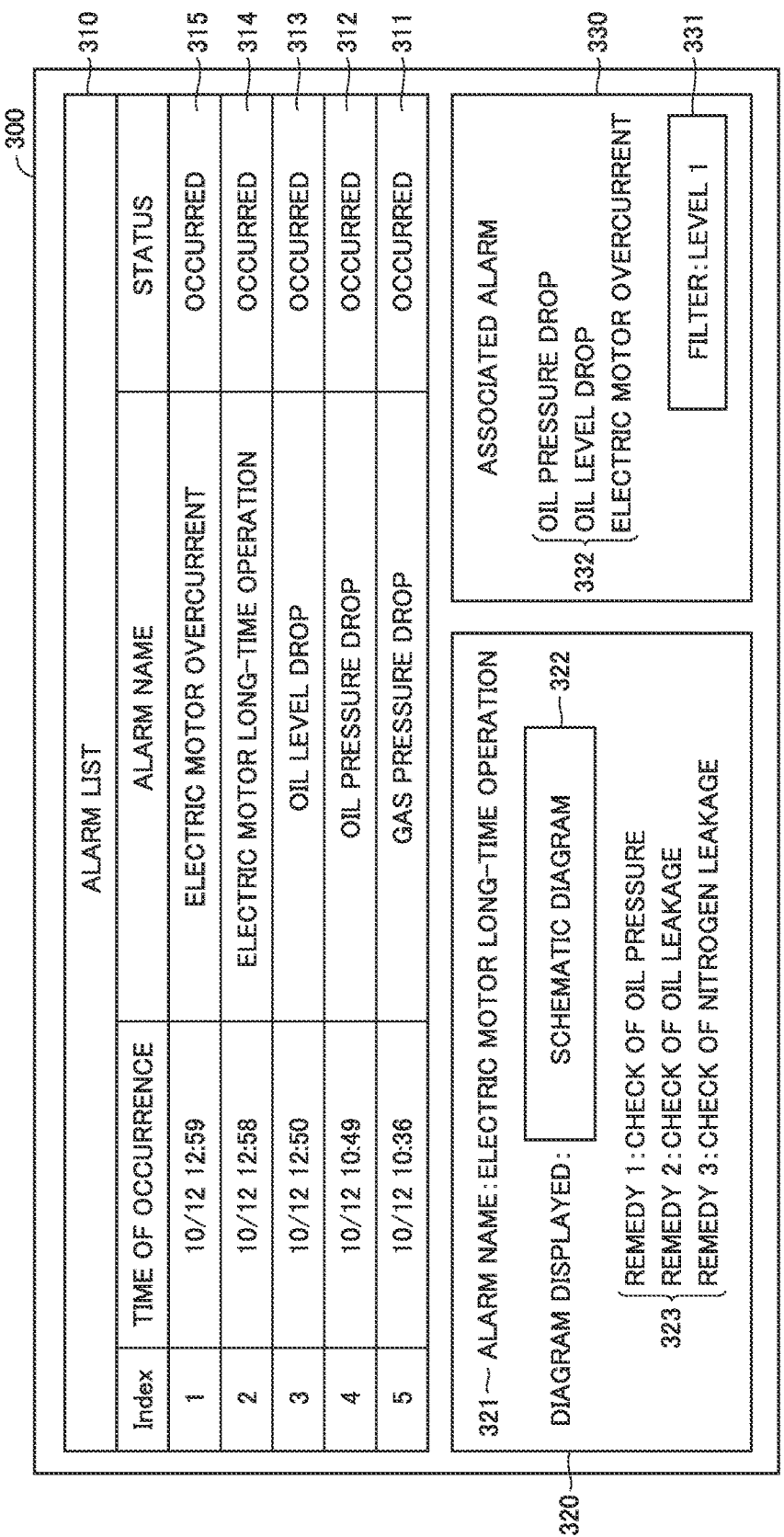
FIG. 3 shows an example alarm screen.

FIG. 3 shows an example alarm screen. Referring to FIG. 3, monitoring control apparatus 100 displays an alarm screen 300 in display 158. Alarm screen 300 includes an alarm list 310, a details display area 320, and an associated display area 330. Herein, target device 2 is a GCB in a transformer station.

Alarm screen 300 is an alarm screen assuming a case where an accident has occurred in a hydraulic actuator of the GCB. The GCB is filled with an SF6 gas and adopts a manner of driving a puffer cylinder that forms a chamber referred to as a puffer chamber by the driving force of the hydraulic actuator, and spraying the SF6 gas in the puffer chamber onto an arc generated between electrodes to extinguish the arc.

Alarm list 310 is list information for notifying the system operator of various abnormalities that have occurred in target device 2. Alarm list 310 includes an index, an alarm name corresponding to an abnormality, a time of occurrence of an abnormality, and a status of an abnormality as main items.

In the example of FIG. 3, alarm display of a drop in the gas pressure of a tank filled with the SF6 gas, drops in the oil pressure and oil level of the hydraulic actuator, a long-time operation of an electric motor that drives the hydraulic actuator, and an overcurrent of the electric motor are shown is performed as abnormalities that have occurred in the GCB. For example, a gas pressure drop alarm 311 with an index "5" indicates that a "gas pressure drop" "has occurred" at "10:36 on October 12". It is assumed here that an abnormality has occurred in a flow as in (1) through (4) below.

(1) The oil pressure of the hydraulic actuator drops, and the gas pressure of the tank filled with the SF6 gas drops, due to age-related deterioration. When the oil pressure of the hydraulic actuator has dropped due to oil leakage or the like, the hydraulic pump operates to increase the oil pressure. Monitoring control apparatus 100 determines that an oil pressure drop has occurred based on a signal from an oil pressure detection circuit provided in the hydraulic actuator, and determines that a gas pressure drop has occurred based on a signal from a gas pressure detection circuit provided in the tank. Monitoring control apparatus 100 displays gas pressure drop alarm 311 and an oil pressure drop alarm 312 in alarm list 310.

(2) When the oil pressure of the hydraulic actuator has dropped due to oil leakage or the like, the hydraulic pump operates several times to increase the oil pressure, which increases the count of operations. The oil level also drops due to oil leakage or the like. Monitoring control apparatus 100 determines that the oil level has dropped based on a signal from an oil level detection circuit provided in the hydraulic actuator, and then displays an oil level drop alarm 313 in alarm list 310.

(3) When the count of operations of the hydraulic pump increases, the operating time of the electric motor for driving the hydraulic pump increases. Monitoring control apparatus 100 determines that a long-time operation of an electric motor has occurred based on a signal from a detection circuit that detects a long-time operation of the electric motor, and then displays an electric motor long-time operation alarm 314 in alarm list 310.

(4) As the operating time of the electric motor increases, an overcurrent occurs in the electric motor. Monitoring control apparatus 100 determines that an overcurrent has occurred in the electric motor based on a signal from an overcurrent detection circuit, and then displays an electric motor overcurrent alarm 315 in alarm list 310.

In the example of FIG. 3, detailed information about a long-time operation of the electric motor is displayed in details display area 320 among a plurality of abnormalities shown in alarm list 310 that have occurred in the GCB. For example, monitoring control apparatus 100 accepts an input to select electric motor long-time operation alarm 314 from the system operator via input device 160, thereby displaying detailed information about a long-time operation of the electric motor in details display area 320.

Details display area 320 includes an alarm name 321 selected, a transition button 322 for transition to a schematic diagram, and a remedy contents group 323 for resolving an abnormality corresponding to the selected alarm (i.e., returning from the abnormality). Herein, "ELECTRIC MOTOR LONG-TIME OPERATION" is displayed as alarm name 321. Remedy contents group 323 includes a first remedy content "CHECK OF OIL PRESSURE", a second remedy content "CHECK OF OIL LEAKAGE", and a third remedy content "CHECK OF NITROGEN LEAKAGE". The system operator can select each of the first to third remedy contents to check more specific remedy contents (e.g., such as check of a sensor failure, replacement of a sensor).

Although the example of FIG. 3 shows a configuration in which remedy contents group 323 includes three remedy contents, the present disclosure is not limited to this configuration. For example, it suffices that remedy contents group 323 includes one or more remedy contents.

Figure 4:
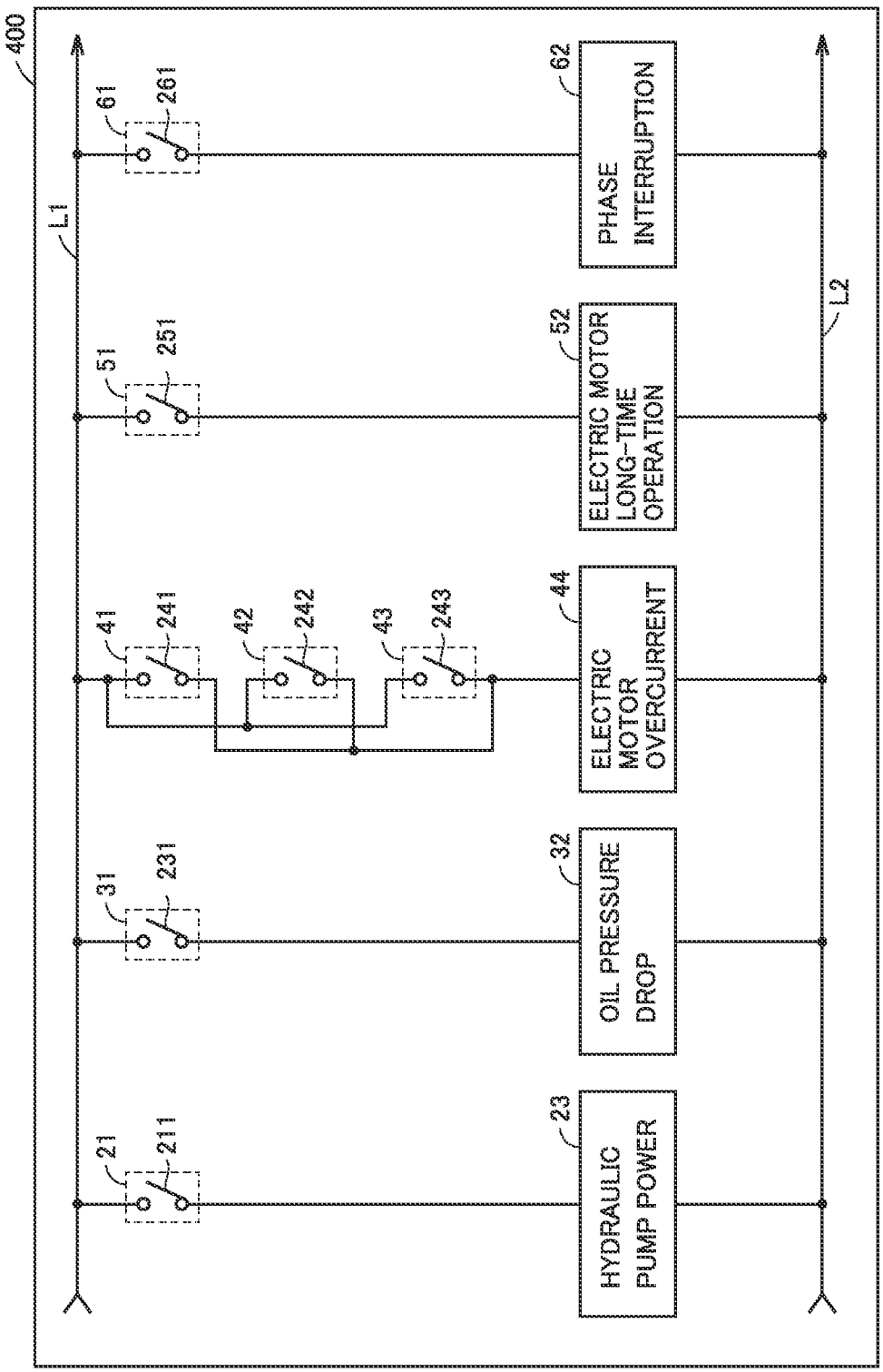
FIG. 4 shows an example display screen of a schematic diagram.

As the system operator selects transition button 322, a schematic diagram as shown in FIG. 4 is displayed. FIG. 4 shows an example of a display screen 400 of the schematic diagram. This schematic diagram includes a circuit element for detecting an abnormality "electric motor long-time operation". Referring to FIG. 4, various contact circuits 21, 31, 41 to 43, 51, 61, and indicators 23, 32, 44, 52, 62 are arranged as circuit elements in the schematic diagram shown in display screen 400. Also, connecting lines L1, L2 for connecting these circuit elements are arranged.

Contact circuit 21 closes contact 211 when detecting a power interruption of the hydraulic pump. Indicator 23 performs alarm display indicating the power interruption of the hydraulic pump when contact 211 is closed. Contact circuit 31 closes contact 231 when detecting an oil pressure drop of the hydraulic actuator. Indicator 32 performs alarm display indicating an oil pressure drop when contact 231 is closed.

Contact circuit 41 closes a contact 241 when detecting an overcurrent in an R phase among three phases of the electric motor. Similarly, contact circuit 42 closes a contact 242 when detecting an overcurrent in an S phase in the electric motor. Contact circuit 43 closes a contact 243 when detecting an overcurrent of a T phase of the electric motor. Indicator 44 performs alarm display indicating that an overcurrent has occurred in the electric motor when any of contacts 241 to 243 is closed (i.e., when an overcurrent has occurred in any one phase among the R phase to T phase of the electric motor).

Contact circuit 51 closes a contact 251 when detecting that the operating time of the electric motor is not less than a reference time (i.e., a long-time operation of the electric motor). Indicator 52 performs alarm display indicating a long-time operation of the electric motor when contact 251 is closed. Contact circuit 61 closes a contact 261 when detecting a phase interruption in any of the phases of the GCB. Indicator 62 performs alarm display indicating a phase interruption when contact 261 is closed.

Indicators 23, 32, 44, 52, 62 typically correspond to the respective LED lamps attached to a control panel of monitoring control apparatus 100. Each indicator typically notifies the system operator of an abnormality by lighting up in the event of an abnormality. For example, indicator 32 lights up in the event of an oil pressure drop. The system operator can grasp what type of abnormality has occurred by checking a lighting indicator. In the event of an abnormality, an alarm corresponding to the abnormality is displayed on alarm screen 300 in display 158.

Referring again to FIG. 3, an oil pressure drop alarm, an oil level drop alarm, and an electric motor overcurrent alarm are displayed in associated display area 330 as an associated alarm 332 associated with electric motor long-time operation alarm 314 selected by the system operator. This means that the abnormality "oil pressure drop alarm", the abnormality "oil level drop", and the abnormality "electric motor overcurrent" are extracted as associated abnormalities associated with the abnormality "electric motor long-time operation". A manner of extracting an associated abnormality will be described below specifically.

Monitoring control apparatus 100 calculates levels of association of the abnormality "electric motor overcurrent", the abnormality "oil level drop", the abnormality "oil pressure drop", and the abnormality "gas pressure drop", corresponding to the other alarms included in alarm list 310, with the abnormality "electric motor long-time operation" corresponding to electric motor long-time operation alarm 314 selected by the system operator.

Specifically, monitoring control apparatus 100 determines whether a condition A1 is satisfied, where condition A1 is a condition that a schematic diagram including a detection circuit for an abnormality X (herein, "electric motor long-time operation") corresponding to the alarm selected by the system operator is identical to a schematic diagram including a detection circuit for the other abnormality. When condition A1 is satisfied, it is conceivable that the degree of association of the other abnormality with abnormality X may be high. This is because the system operator wants to simultaneously check abnormality X and an abnormality which is highly likely to occur concomitantly with abnormality X, and accordingly, the detection circuits for these abnormalities are arranged in the same schematic diagram in many cases.

The schematic diagram shown in FIG. 4 includes a detection circuit (e.g., contact circuit 51) for the abnormality "electric motor long-time operation", a detection circuit (e.g., contact circuit 31) for the abnormality "oil pressure drop", and detection circuits (e.g., contact circuit 41 to 43) for the abnormality "electric motor overcurrent". In other words, the schematic diagram corresponding to the abnormality "electric motor long-time operation" is identical to the schematic diagrams corresponding to the abnormality "oil pressure drop" and the abnormality "electric motor overcurrent".

Monitoring control apparatus 100 increases the level of association of each of the abnormality "oil pressure drop" and the abnormality "electric motor overcurrent" with the abnormality "electric motor long-time operation" by "1". In contrast, the abnormality "oil level drop" and the abnormality "gas pressure drop" do not satisfy condition A1, and accordingly, the levels of association thereof are not increased.

Monitoring control apparatus 100 then determines whether a condition A2 is satisfied, where condition A2 is a condition that a target part for abnormality X is identical to a target part for the other abnormality. When condition A2 is satisfied, it is conceivable that the degree of association of the other abnormality with abnormality X may be high. This is because abnormality X and the other abnormality are highly likely to occur concurrently when the target part for abnormality X is identical to the target part for the other abnormality.

The abnormality "electric motor overcurrent", the abnormality "electric motor long-time operation", the abnormality "oil level drop", and the abnormality "oil pressure drop" are abnormalities in the hydraulic actuator and have the same target part. In contrast, the abnormality "gas pressure drop" is an abnormality in the gas tank filled with the SF6 gas and has a target part different from the target parts for the above four abnormalities.

Monitoring control apparatus 100 increases the level of association of each of the abnormality "electric motor overcurrent", the abnormality "oil level drop", and the abnormality "oil pressure drop" with the abnormality "electric motor long-time operation" by "1". In contrast, the abnormality "gas pressure drop" does not satisfy condition A2, and accordingly, the level of association thereof is not increased.

Monitoring control apparatus 100 then determines whether a condition A3 is satisfied, where condition A3 is a condition that a difference between a time of occurrence of abnormality X and a time of occurrence of the other abnormality is not more than a reference time (e.g., not more than one minute). When condition A3 is satisfied, it is conceivable that the degree of association of the other abnormality with abnormality X may be high. This is because abnormality X and the other abnormality are highly likely to have occurred by the same cause when the time of occurrence of abnormality X and the time of occurrence of the other abnormality are close to each other.

As shown in FIG. 3, the time of occurrence of the abnormality "electric motor long-time operation" is 12:58 on October 12, and an abnormality that has occurred within one minute from this time of occurrence is only the abnormality "electric motor overcurrent".

Monitoring control apparatus 100 increases the level of association of the abnormality "electric motor overcurrent" with the abnormality "electric motor long-time operation" by "1". In contrast, the abnormality "gas pressure drop", the abnormality "oil pressure drop", and the abnormality "oil level drop" do not satisfy condition A3, and accordingly, the levels of association thereof are not increased.

Monitoring control apparatus 100 further determines whether a condition A4 is satisfied, where condition A4 is a condition that the remedy contents for the other abnormality are included in the remedy contents for abnormality X. When condition A4 is satisfied, it is conceivable that the degree of association of the other abnormality with abnormality X may be high. This is because when the remedy contents for abnormality X are identical to those for the other abnormality, these abnormalities are highly likely to occur by the same cause.

Since the occurrence of abnormality X (herein, abnormality "electric motor long-time operation") is caused by an oil pressure drop in many cases, it is basically aimed to restore an oil pressure. Thus, the remedy contents for the abnormality "electric motor overcurrent" include the first remedy content "check of oil pressure", the second remedy content "check of oil leakage", and the third remedy content "check of nitrogen leakage" as shown in FIG. 3.

Herein, the remedy contents for the abnormality "oil level drop" and the abnormality "oil pressure drop" are identical to the remedy contents for the abnormality "electric motor long-time operation". In contrast, the remedy contents for the abnormality "electric motor overcurrent" are check of an abnormality of an electric motor and replacement of a part, and accordingly, none of these remedy contents are identical to the remedy contents for "electric motor long-time operation". The remedy contents for the abnormality "gas pressure drop" include check of a gas pressure and the like, and accordingly, none of these remedy contents are identical to those for the abnormality "electric motor long-time operation".

Monitoring control apparatus 100 increases the level of association of each of the abnormality "oil level drop" and the abnormality "oil pressure drop" with the abnormality "electric motor long-time operation" by "3". In the case of condition A4, the levels of association are increased significantly compared with conditions A1 to A3. When the remedy contents for abnormality X are identical to those for the other abnormality, these abnormalities are highly likely to be resolved by performing the remedy therefor. Since condition A4 has a degree of importance higher than those of conditions A1 to A3, in calculation of the level of association of each abnormality, the level of association is increased significantly when condition A4 is satisfied.

The above has described the configuration in which the remedy contents for the abnormality "electric motor long-time operation" are completely identical to the remedy contents for the abnormality "oil level drop" and the abnormality "oil pressure drop", but the present disclosure is not limited to this configuration. For example, when at least one remedy content for the other abnormality is included in a plurality of remedy contents for abnormality X, monitoring control apparatus 100 may determine that condition A4 is satisfied. For example, when any of the first to third remedy contents for abnormality X is included in the remedy contents for the other abnormality, monitoring control apparatus 100 may determine that condition A4 is satisfied.

Monitoring control apparatus 100 calculates a level of association of another abnormality with abnormality X based on conditions A1 to A4 described above. Since the abnormality "oil pressure drop" satisfies conditions A1, A2, A4, the level of association with the abnormality "electric motor long-time operation" is "5". Since the abnormality "oil level drop" satisfies conditions A2, A4, the level of association is "4". Since the abnormality "electric motor overcurrent" satisfies conditions A1, A2, A3, the level of association is "3". Since the abnormality "gas pressure drop" satisfies none of conditions A1 to A4, the level of association is "0".

When the level of association of another abnormality is not less than a threshold, monitoring control apparatus 100 extracts the other abnormality as an associated abnormality associated with abnormality X. In the example of FIG. 3, this threshold is set at "1" (corresponds to "FILTER: LEVEL 1" in the figure). Monitoring control apparatus 100 thus extracts, as the associated abnormalities, the abnormality "oil level drop", the abnormality "oil level drop", and the abnormality "electric motor overcurrent", each of which has a level of association of not less than "1" with the abnormality "electric motor long-time operation".

Monitoring control apparatus 100 then displays associated alarm 332 (i.e., an oil pressure drop alarm, an oil level drop alarm, and an electric motor overcurrent alarm) for notifying the extracted associated abnormalities (i.e., oil pressure drop, oil level drop, and electric motor overcurrent).

For condition A4, monitoring control apparatus 100 may change a manner of increasing a level of association in accordance with a degree of coincidence of remedy contents. For example, when a plurality of remedy contents for abnormality X coincide with a plurality of remedy contents for another abnormality in three or more remedy contents, the level of association of the other abnormality with abnormality X is increased by "3". When a plurality of remedy contents for abnormality X coincide with a plurality of remedy contents for another abnormality in two remedy contents, the level of association of the other abnormality with abnormality X may be increased by "2". When a plurality of remedy contents for abnormality X coincide with a plurality of remedy contents for another abnormality in one remedy content, the level of association of the other abnormality with abnormality X may be increased by "1".

(Other Display Examples of Alarm Screen)

Figure 5:
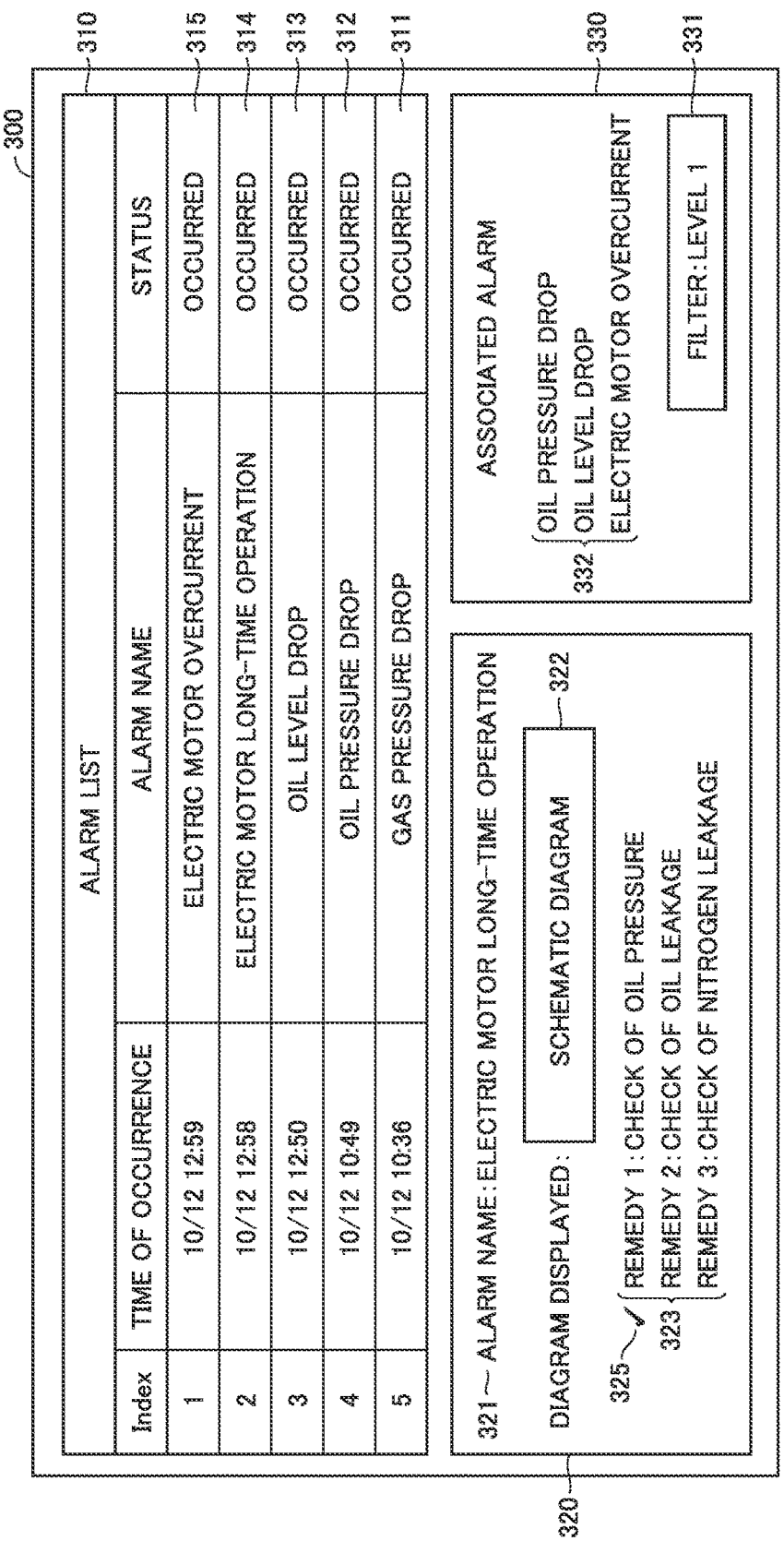
FIG. 5 is a diagram for illustrating another example display of the alarm screen.
Figure 6:
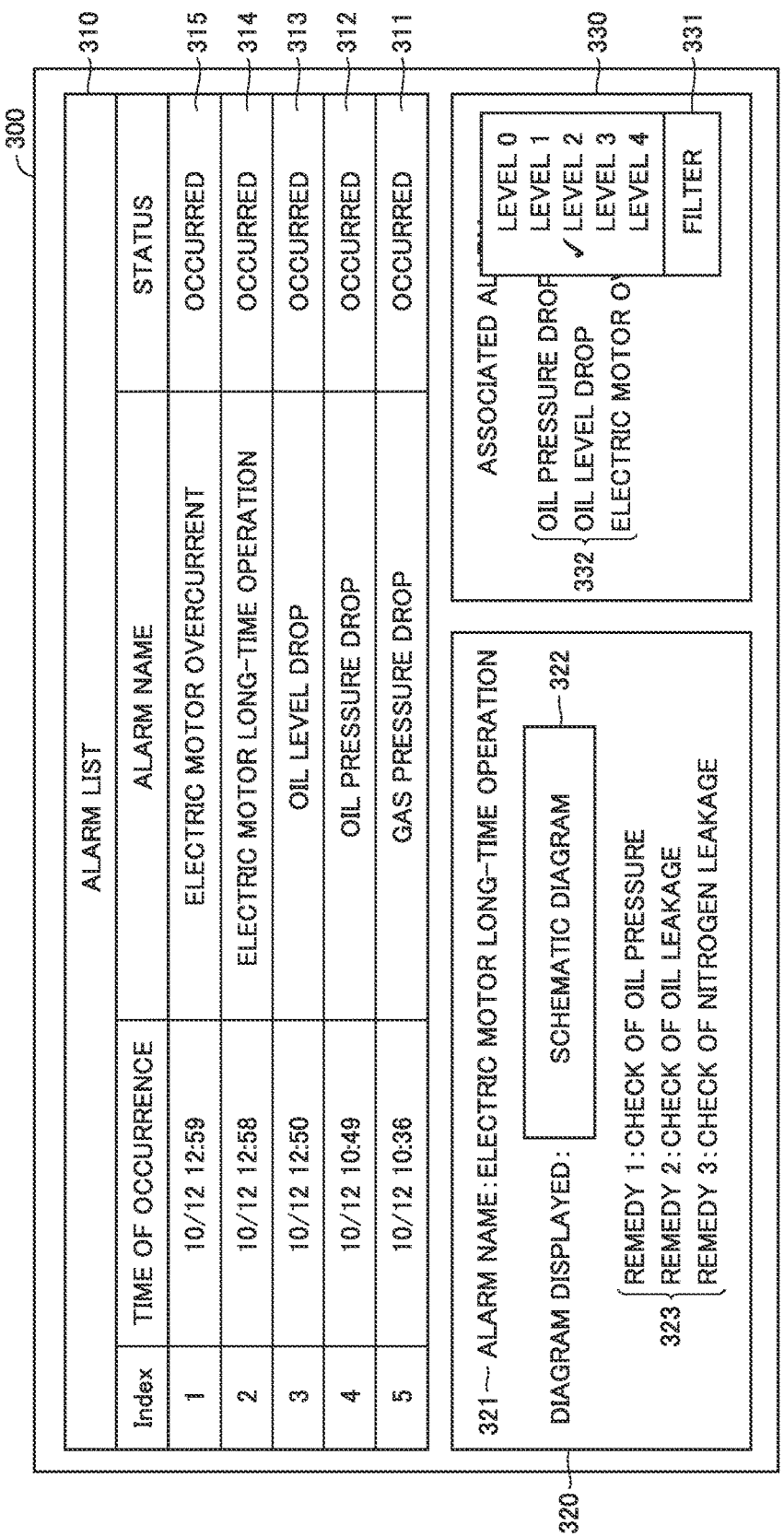
FIG. 6 is a diagram for illustrating still another example display of the alarm screen.

FIGS. 5 and 6 are diagrams for illustrating other display examples of the alarm screen. Referring to FIG. 5, when a remedy for an abnormality is complete, monitoring control apparatus 100 displays an object (e.g., icon) indicating the completion of the remedy. In the example of FIG. 5, an object 325 indicating the completion of the first remedy content "check of oil pressure" for the abnormality "electric motor long-time operation" is displayed. When the associated abnormality (e.g., abnormality "oil pressure drop") is resolved by a remedy for the abnormality or by another cause, the associated alarm corresponding to the resolved abnormality "oil pressure drop" is deleted from associated display area 330.

Thus, the system operator can immediately check that remedy is complete, allowing a smooth shift to the next remedy without requiring a check operation. The system operator can also grasp in real time how many associated alarms are present, and accordingly, can determine the nature of an abnormality required to be handled.

Referring to FIG. 6, monitoring control apparatus 100 displays an entry for selecting any of levels of association "0" to "4" when accepting an input to select a filter 331 by the system operator. Monitoring control apparatus 100 displays a list of associated alarms not lower than the level of association selected by the system operator. Specifically, when level of association "4" is selected, monitoring control apparatus 100 extracts, as associated abnormalities, the abnormality "oil level drop" and the abnormality "oil level drop", each of which has a level of association of not less than "4" with the abnormality "electric motor long-time operation", and displays associated alarms corresponding to these associated abnormalities. The system operator can select an associated alarm to be displayed, depending on the situation, with the use of a filter.

<Functional Configuration>

Figure 7:
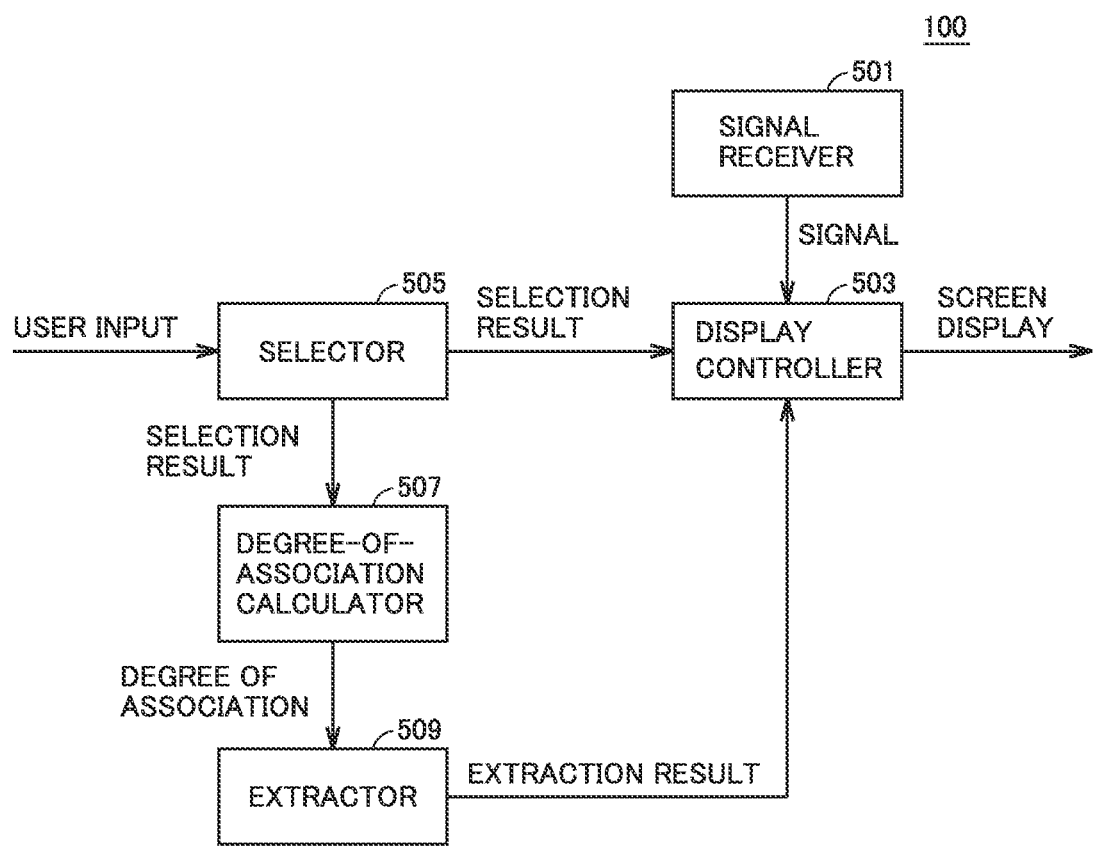
FIG. 7 is a block diagram showing a functional configuration of the monitoring control apparatus.

FIG. 7 is a block diagram showing a functional configuration of monitoring control apparatus 100. Referring to FIG. 7, monitoring control apparatus 100 includes a signal receiver 501, a display controller 503, a selector 505, a degree-of-association calculator 507, and an extractor 509 as the main functional configuration. Each of these functions is implemented by, for example, processor 150 executing a program stored in secondary storage device 154. In an alternative configuration, some or all of these functions may be implemented by hardware.

Signal receiver 501 receives various signals transmitted from target device 2. Signal receiver 501 typically receives abnormal signals detected by the various detection circuits provided in target device 2.

Display controller 503 displays an alarm screen (e.g., alarm screen 300 of FIG. 3) for notifying a plurality of abnormalities that have occurred in monitoring target device 2, based on the received various abnormal signals.

Selector 505 selects any abnormality X among the plurality of abnormalities that have occurred in monitoring target device 2. Selector 505 typically selects any abnormality X from among the plurality of abnormalities displayed on alarm screen 300, in accordance with an instruction by a user (e.g., system operator) via input device 160. Display controller 503 displays detailed information about the selected abnormality X on alarm screen 300. In the example of FIG. 3, the detailed information on the selected abnormality "electric motor long-time operation" is displayed in details display area 320.

For each of one or more other abnormalities except for abnormality X among the plurality of abnormalities, degree-of-association calculator 507 calculates a degree of association (e.g., level of association) of the other abnormality with abnormality X based on a plurality of conditions (e.g., conditions A1 to A4). In the example of FIG. 3, degree-of-association calculator 507 calculates a degree of association of each of the abnormality "gas pressure drop", the abnormality "oil pressure drop", the abnormality "oil level drop", and the abnormality "electric motor overcurrent" with the abnormality "electric motor long-time operation".

In an aspect, when condition A1 that a schematic diagram including a detection circuit for abnormality X is identical to a schematic diagram including a detection circuit for another abnormality is satisfied, degree-of-association calculator 507 increases the degree of association of the other abnormality with abnormality X by a reference value E1 (e.g., "1"). Also, when condition A2 that the target part for abnormality X is identical to the target part for another abnormality is satisfied, degree-of-association calculator 507 increases the degree of association of the other abnormality with abnormality X by reference value E1. Further, when condition A3 that a difference between a time of occurrence of abnormality X and a time of occurrence of another abnormality is not more than a reference time (e.g., not more than one minute) is satisfied, degree-of-association calculator 507 increases the degree of association of the other abnormality with abnormality X by reference value E1.

In another aspect, when condition A4 that at least one remedy content for another abnormality is included in at least one remedy content for abnormality X is satisfied, degree-of-association calculator 507 increases the degree of association of the other abnormality with abnormality X by a reference value E2 (e.g., "3") greater than reference value E1.

When the degree of association of another abnormality is not less than a threshold Th, extractor 509 extracts the other abnormality as an associated abnormality associated with abnormality X. Threshold Th can be changed appropriately by selecting filter 331 displayed on alarm screen 300. For example, when "1" is selected in filter 331, threshold Th is "1".

Display controller 503 displays associated alarm 332 for notifying the associated abnormality extracted by extractor 509 in associated display area 330 of alarm screen 300.

<Procedure>

FIG. 8 shows an example procedure of monitoring control apparatus 100. The flowchart of FIG. 8 shows a procedure of displaying an associated alarm. Each step below is typically performed by processor 150 of monitoring control apparatus 100.

Referring to FIG. 8, processor 150 displays alarm list 310 on alarm screen 300 based on an abnormal signal received from target device 2 (step S10). Processor 150 receives an input to select any alarm of alarm list 310 via input device 160 (step S12). Processor 150 calculates a level of association of another abnormality with abnormality X corresponding to the selected alarm (step S14).

Processor 150 extracts an associated abnormality of abnormality X (step S16). Specifically, when the level of association of the other abnormality with abnormality X is not less than threshold Th, processor 150 extracts the other abnormality as an associated abnormality. Processor 150 displays associated alarm 332 corresponding to the associated abnormality on alarm screen 300 (step S18), and then ends the processing.

<Advantageous Effects>

Monitoring control apparatus 100 according to the present embodiment appropriately notifies the association among a plurality of abnormalities that have occurred in target device 2. In the event that a plurality of abnormalities have occurred in target device 2, thus, the system operator can immediately grasp a degree of association between an abnormality and another abnormality. Since an abnormality highly associated with an abnormality corresponding to an alarm selected by the system operator is displayed automatically, an improvement in operation efficiency for an abnormality is expected. Since the remedy contents for abnormalities are displayed in the details display area, the system operator can immediately grasp a remedy required for the occurring abnormality.

Other Embodiment

The above embodiment has described the case where target device 2 is a GCB, but target device 2 may be any other device. An example display of an alarm screen when target device 2 is a transformer will be described as another example.

FIG. 9 shows an example alarm screen according to another embodiment. Referring to FIG. 9, monitoring control apparatus 100 displays an alarm screen 350 on display 158. Alarm screen 350 includes alarm list 310, details display area 320, and associated display area 330. Herein, target device 2 is a transformer in a transformer station.

Alarm screen 350 is an alarm screen assuming a case where an accident has occurred in a transformer. In the example of FIG. 9, an overcurrent in a transformer, detection of gas in the transformer, any abnormality (corresponding to "LR abnormality" in the figure) in a tap changer, an operation of a pressure relief valve in a transformer, and incomplete tap changing are displayed as abnormalities that have occurred in the transformer. For example, each type of abnormality occurs in the flow as in (1) through (5) below.

(1) An overcurrent relay in a transformer operates due to a short-circuit accident. Monitoring control apparatus 100 determines that an overcurrent has occurred based on a signal from the overcurrent relay and displays an overcurrent alarm 361 in alarm list 310.

(2) Cracked gas is detected, which has occurred in pyrolysis of insulating oil and insulator due to local overheating, discharging or the like in the transformer. Monitoring control apparatus 100 determines that cracked gas has occurred based on a signal from a gas detection circuit and displays a gas detection alarm 362 in alarm list 310.

(3) Any abnormality occurs in a tap changer. Monitoring control apparatus 100 determines that the abnormality has occurred based on a signal from the tap changer and displays an LR abnormality alarm 363 in alarm list 310.

(4) The generation of cracked gas increases the pressure in the transformer, thus operating the pressure relief valve. Monitoring control apparatus 100 displays a pressure relief valve operation alarm 364 in alarm list 310 based on an operation signal of the pressure relief valve.

(5) Incomplete tap changing occurs when a tap cannot be changed within a certain period of time. Based on a signal indicating the occurrence of incomplete tap changing, monitoring control apparatus 100 displays an incomplete tap changing alarm 365 in alarm list 310.

Detailed information corresponding to the abnormality "pressure relief valve operation" is displayed in details display area 320. Remedy contents group 323 corresponding to the abnormality "pressure relief valve operation" includes a first remedy content "stop of transformer operation", a second remedy content "analysis of gas", and a third remedy content "internal inspection".

Monitoring control apparatus 100 calculates the level of association of each of the abnormality "overcurrent", the abnormality "gas detection", the abnormality "LR", and the abnormality "incomplete tap changing" with the abnormality "pressure relief valve operation" based on conditions A1 to A4 described above.

For example, the abnormality "overcurrent" and the abnormality "gas detection" satisfy conditions A1, A2, and accordingly, the levels of association thereof with the abnormality "pressure relief valve operation" are "2". The abnormality "LR" satisfies condition A3, and accordingly, the level of association thereof is "1". The abnormality "incomplete tap changing" satisfies none of conditions A1 to A4, and accordingly, the level of association thereof is "0".

Monitoring control apparatus 100 extracts other abnormalities, each having a level of association of not less than "2", based on the calculation result of the level of association, and displays associated alarm 332 corresponding to the extracted other abnormalities in associated display area 330. In the example of FIG. 9, this threshold is set at "2" (corresponding to "FILTER: "LEVEL 2" in the figure). Monitoring control apparatus 100 thus displays a gas detection alarm and an overcurrent alarm as the associated alarms.

Each of the configurations illustrated as the embodiments described above is an example of the configuration of the present disclosure, and it can be combined with another known technique, or can be modified, for example partially omitted, within the scope not departing from the gist of the present disclosure. Further, in each embodiment described above, the process or the configuration described in the other embodiment may be employed and implemented as appropriate.

It should be understood that the embodiments disclosed herein are illustrative and non-restrictive in every respect. The scope of the present disclosure is defined by the scope of the claims, rather than the description above, and is intended to include any modifications within the scope and meaning equivalent to the scope of the claims.

INDUSTRIAL APPLICABILITY 2 monitoring target device; 4 network; 21, 31, 41, 42, 43, 51, 61 contact circuit; 23, 32, 44, 52, 62 indicator; 100 monitoring control apparatus; 150 processor; 152 main storage device; 154 secondary storage device; 156 communication interface; 158 display; 160 input device; 162 speaker; 164 general-purpose interface; 166 internal bus; 300, 350 alarm screen; 310 alarm list; 320 details display area; 323 remedy contents group; 330 associated display area; 332 associated alarm; 400 display screen; 501 signal receiver; 503 display controller; 505 selector; 507 degree-of-association calculator; 509 extractor.

The invention claimed is:

1. A monitoring control apparatus in combination with transformer station equipment, the monitoring control apparatus comprising:

a hardware processor configured to:

display an alarm screen for notifying a plurality of abnormalities occurring in the transformer station equipment, the transformer station equipment provided in an electric power system;

select a first abnormality among the plurality of abnormalities;

calculate, for each of one or more other abnormalities except for the first abnormality among the plurality of abnormalities, a degree of association of the other abnormality with the first abnormality; and extract the other abnormality as an associated abnormality associated with the first abnormality when the degree of association of the other abnormality is not less than a threshold, wherein the alarm screen includes an associated alarm for notification of the extracted associated abnormality, wherein the hardware processor is configured to, when a schematic diagram including a detection circuit for the first abnormality is identical to a schematic diagram including a detection circuit for the other abnormality, increase the degree of association of the other abnormality with the first abnormality by a first reference value.

2. The monitoring control apparatus according to claim 1, wherein the hardware processor is configured to, when a target part for the first abnormality is identical to a target part for the other abnormality, increase the degree of association of the other abnormality with the first abnormality by the first reference value.

3. The monitoring control apparatus according to claim 2, wherein the hardware processor is configured to, when a difference between a time of occurrence of the first abnormality and a time of occurrence of the other abnormality is not more than a reference time, increase the degree of association of the other abnormality with the first abnormality by the first reference value.

4. The monitoring control apparatus according to claim 3, wherein the hardware processor is configured to, when at least one remedy content for the other abnormality is included in at least one remedy content for the first abnormality, increase the degree of association of the other abnormality with the first abnormality by a second reference value greater than the first reference value.

5. The monitoring control apparatus according to claim 3, wherein the alarm screen further includes at least one remedy content for the first abnormality.

6. The monitoring control apparatus according to claim 2, wherein the hardware processor is configured to, when at least one remedy content for the other abnormality is included in at least one remedy content for the first abnormality, increase the degree of association of the other abnormality with the first abnormality by a second reference value greater than the first reference value.

7. The monitoring control apparatus according to claim 6, wherein the alarm screen further includes at least one remedy content for the first abnormality.

8. The monitoring control apparatus according to claim 2, wherein the alarm screen further includes at least one remedy content for the first abnormality.

9. The monitoring control apparatus according to claim 1, wherein the alarm screen further includes at least one remedy content for the first abnormality.

* * * * *